United States Patent
Thomasson et al.

[11] 3,771,857
[45] Nov. 13, 1973

[54] STRIPED DICHROIC FILTER AND METHOD FOR MAKING THE SAME

[75] Inventors: David G. Thomasson; Frederick K. Crosher; Michael D. Temple; Leroy A. Bartolmei; Richard Ian Seddon, all of Santa Rosa, Calif.

[73] Assignee: Optical Coating Laboratory, Inc., Santa Rosa, Calif.

[22] Filed: Apr. 19, 1971

[21] Appl. No.: 135,131

[52] U.S. Cl. .................. 350/166, 350/316, 350/317
[51] Int. Cl. ........................................ G02b 5/28
[58] Field of Search ............ 350/163–166, 316, 317

[56] References Cited
UNITED STATES PATENTS

| | | | |
|---|---|---|---|
| 3,585,286 | 6/1971 | Macovski | 350/317 UX |
| 2,769,111 | 10/1956 | Sadowsky | 350/164 UX |
| 3,619,041 | 11/1971 | Willoughby | 350/316 X |
| 2,999,034 | 9/1961 | Heidenhain | 350/164 X |

FOREIGN PATENTS OR APPLICATIONS

| | | | |
|---|---|---|---|
| 790,681 | 2/1958 | Great Britain | 350/317 |

OTHER PUBLICATIONS

Baumeister, "Notes on Multilayer Optical Filters" MI-L-HDBK-140 – page 20–16, RCVD:4–1964.

Primary Examiner—Ronald L. Wibert
Attorney—Flehr, Hohbach, Test, Albritton & Herbert

[57] ABSTRACT

Striped dichroic filter having a substantially transparent glass substrate with a surface and having first and second sets of spaced parallel stripes disposed on said surface at an angle with respect to each other and with each of said sets of stripes being capable of reflecting at least one different color and with the stripes being formed of a plurality of layers of high and low index dielectric materials.

In the method for making a striped dichroic filter, first and second sets of spaced parallel stripes are sequentially formed by sequentially depositing dielectric coating materials on sequentially formed stripe material which is subsequently etched away to remove the undesired portions of the coating material so that there remains first and second sets of spaced parallel stripes at angles with respect to each other and with each being capable of reflecting at least one different color.

10 Claims, 18 Drawing Figures

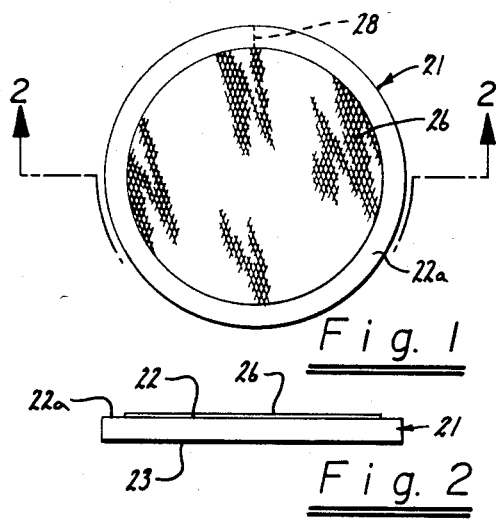
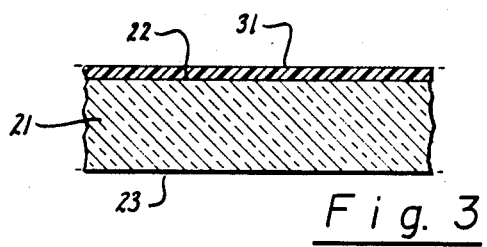
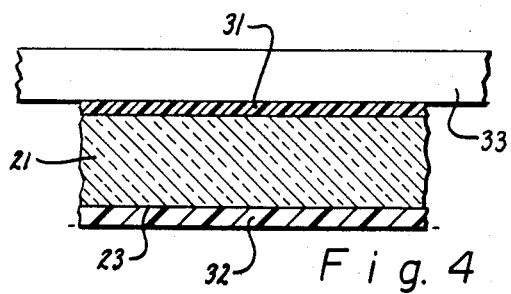
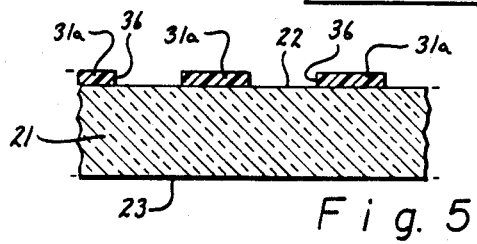
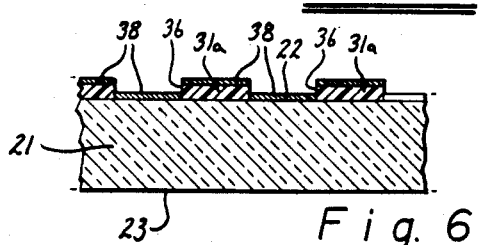
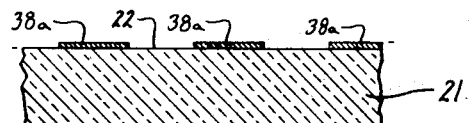
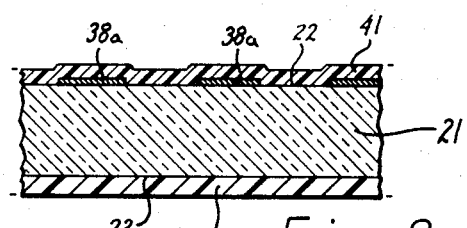
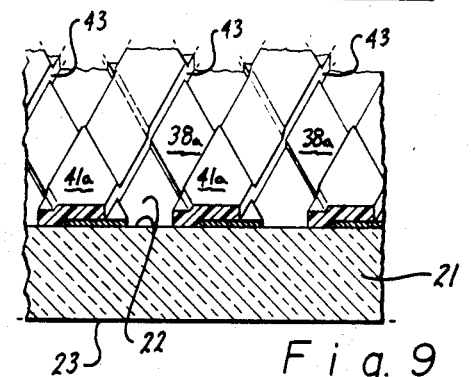
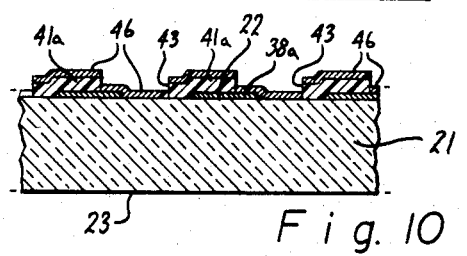
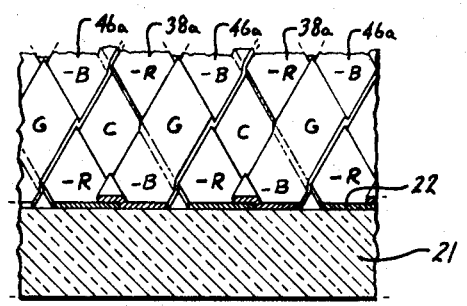
INVENTORS
David G. Thomasson
Frederick K. Crosher
Michael D. Temple
Leroy A. Bartolmei
Richard Ian Seddon
Attorneys INVENTORS
David G. Thomasson
Frederick K. Crosher
Michael D. Temple
Leroy A. Bartolmei
Richard Ian Seddon BY
Flehr, Hohbach, Test,
Albritton & Herbert
Attorneys

STRIPED DICHROIC FILTER AND METHOD FOR MAKING THE SAME

BACKGROUND OF THE INVENTION

1. Field of the Invention

This invention relates to striped dichroic filters which are particularly useful in connection with color television making it possible to utilize a single vidicon tube for viewing the scene to produce a color image and a method for making striped dichroic filters.

2. Description of Prior Art

Satisfactory striped dichroic filters have heretofore not been available. Heretofore, filters having a single set of spaced parallel stripes have been provided. However, even these have not been satisfactory because the stripes have been formed of materials which have been relatively soft. There is, therefore, a need for a new and improved striped dichroic filter.

SUMMARY OF THE INVENTION AND OBJECTS

The striped dichroic filter consists of a substantially transparent glass substrate which has a surface. A first set of spaced parallel stripes capable of reflecting at least one color are provided. A second set of spaced parallel stripes capable of reflecting at least one color different from said one color reflected by said first set of stripes is also provided. The first and second sets of stripes are disposed on said surface at an angle with respect to each other with the first and second sets overlying each other on certain areas of said surface. Each of the stripes is formed of a plurality of layers of high and low index dielectric materials. A third set of spaced parallel stripes can be provided which are disposed on said surface at an angle with respect to said first and second sets of stripes and are capable of reflecting at least one color different from the one colors reflected by the first and second sets of stripes.

In the method for forming the striped dichroic filter, relatively thick spaced parallel stripes of the material are formed on the substrate. Dielectric coating materials are deposited on the stripes and on the surface to a depth which is insufficient to cover the side walls of the stripes. The material is then etched away for lifting off the coating material carried by the stripes so that there remains a first set of spaced parallel stripes of the coating materials on the substrate. Additional, relatively thick spaced parallel stripes of a material are formed on the substrate and on the first set of stripes. Dielectric coating materials are deposited on the additional stripes and on said first set of stripes and said surface to a depth insufficient to cover the side walls of the additional stripes. The additional stripes are then etched away to lift off the coating material carried by the additional stripes so that there remains the second set of spaced parallel stripes of coating materials on the surface of the substrate disposed at an angle with respect to the first set of spaced parallel stripes. If desired, an additional third set of spaced parallel stripes can be formed on the substrate with the stripes of each set being capable of reflecting at least one color different from the colors reflected by the other sets of stripes.

In general, it is an object of the present invention to provide a striped dichroic filter in which the stripes are formed by a plurality of layers of high and low index dielectric materials.

Another object of the invention is to provide a filter of the above character in which more than one set of stripes is provided with each set of stripes being disposed at an angle with respect to the other sets of stripes.

Another object of the invention is to provide a filter of the above character in which the stripes are formed of materials which can be readily cleaned without damaging the stripes.

Another object of the invention is to provide a filter of the above character in which the stripes are relatively durable.

Another object of the invention is to provide a filter of the above character in which the sets of stripes are disposed on the same surface of the substrate.

Another object of the invention is to provide a filter of the above character in which the stripes provide good spectral performance.

Another object of the invention is to provide a filter of the above character in which each set of stripes is capable of reflecting at least one color different from the other sets of stripes.

Another object of the invention is to provide a filter of the above character in which high line densities can be obtained.

Another object of the invention is to provide a method for making striped dichroic filters which utilizes a lift-off technique.

Another object of the invention is to provide a method of the above character in which a photoresist lift-off technique is utilized.

Another object of the invention is to provide a method of the above character which is repeatable.

Another object of the invention is to provide a method of the above character which has high yield.

Additional objects and features of the invention will appear from the following description in which the preferred embodiments are set forth in detail in conjunction with the accompanying drawing.

BRIEF DESCRIPTION OF THE DRAWING

FIG. 1 is a plan view of a striped dichroic filter incorporating the present invention.

FIG. 2 is an elevational view looking along the line 2—2 of FIG. 1.

FIGS. 3–11 are enlarged cross-sectional views which show the method for making a striped dichroic filter with stripes of two colors.

DESCRIPTION OF THE PREFERRED EMBODIMENTS

Figure 12:
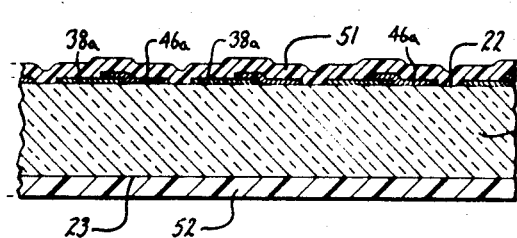
FIGS. 12–15 are cross-sectional views showing additional steps required for making a filter having stripes of three colors.
Figure 13:
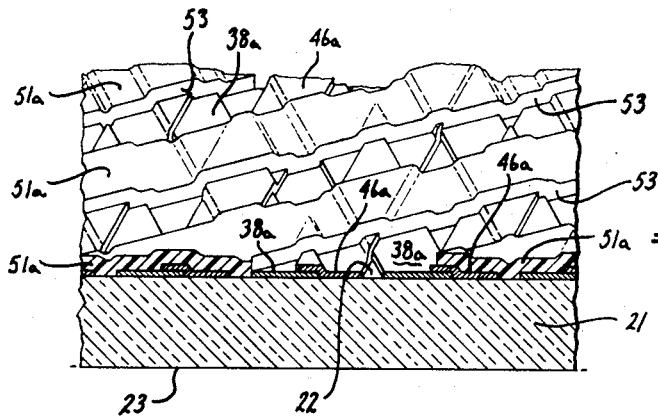

In FIGS. 1 and 2, there is shown a striped dichroic filter incorporating the present invention. As shown therein, the filter consists of a substrate 21 which is substantially transparent. It is preferably formed of a low coefficient expansion glass such as Pyrex type 7052 (Kovar sealing glass) supplied by Corning Glass Works having an index of refraction of 1.52. The substrate 21 is provided with two spaced parallel surfaces 22 and 23 which are highly polished (60–40 over the entire surface) and are very flat (3 fringes or less over a diameter of the part). The substrate 21 can have any desired size. For example, it can have a diameter of approximately one inch and have a thickness of approximately 0.1 inch.

A cross-stripe coating 26 is deposited on the surface 22 and forms the striped dichroics for the filter as hereinafter described. As will be noted, the coating 26 does not cover the entire surface 22 but is limited so that an outer annular region 22a of the surface 22 remains uncoated. A fiducial mark 28 is provided on the substrate 21 and is located on the side 23 opposite the side 22 on which the coating 26 is deposited and is positioned so that it is visible through the clear surface area 22a. The fiducial mark may be applied in any desired manner such as by scribing, painting, etching, sawing and the like.

One method by which the coating 26 is formed on the substrate 21 to provide the striped dichroic filter may now be briefly described as follows. A substrate 21 of the character hereinbefore described is obtained and the fiducial mark 28 is applied to the substrate 21 in the desired location. The substrate 21 is then thoroughly cleaned. After it has been cleaned, a layer 31 of material such as a layer of a conventional photoresist such as Eastman Kodak KTFR is applied to the surface 22 until it has a thickness ranging from 4 to 4 microns. The photoresist can be applied in any desired manner such as by dropping liquid photoresist onto the surface 22 while the substrate 21 is being spun. After the layer 31 of photoresist has been applied, it is permitted to dry. This drying can be facilitated by placing the substrate 21 in an oven or other suitable heating means to provide a pr-exposure bake at atmospheric (no vacuum) for a suitable period of time so that the photoresist is dry as, for example, 10 minutes at 75° C. (167° F.).

After the photoresist has been permitted to dry, a red antihalation coating 32 (see FIG. 4) is applied to the fiducial mark on side 23 of substrate 21 by brushing or spraying it on and is then permitted to air dry. One material found to be satisfactory for this purpose is supplied by Norland. The red antihalation coating is provided to prevent second surface reflection from the surface 23 of the substrate. If the anti-halation coating were not present, some of the ultra-violet energy would be reflected back by the second surface 23 to expose additional portions of the photoresist which would be undesirable. In other words, a ghost image would be produced in the photoresist. The antihalation coating on the surface 23 serves to make the surface 23 look as if there were no discontinuity and, in addition, the antihalation coating serves to absorb ultra-violet energy so that in effect the glass substrate 21 appears to have infinite depth and, therefore, does not provide a second surface reflection.

The photoresist is then exposed through a master mask such as a chrome photomask 33 utilizing collimated light from a light source which includes a Xenon arc lamp. This ensures that a collimated beam will strike the mask and will penetrate the photoresist layer 31 in straight lines. The fiducial mark 28 is utilized to align the substrate 21 with the mask. The ultra-violet light emanating from the Xenon arc source polymerizes the photoresist where it strikes the photoresist.

After the photoresist layer 31 has been exposed, the antihalation layer 32 can be removed in a suitable manner such as by the use of Scotch tape.

The photoresist layer 31 is then developed by utilizing a suitable developer such as Eastman Kodak KTFR developer which removes the photoresist which has not been polymerized by the ultra-violet light. After use of the developer, the substrate is rinsed with a KTFR rinse and then blown dry. These steps are repeated as necessary until the development is complete which can be ascertained by visual inspection of the photoresist layer 31 under a microscope. After the photoresist has been developed, there are provided a plurality of spaced parallel stripes 31a of the photoresist material with spaced parallel recesses 36 in the photoresist exposing the surface 22 as shown in FIG. 5.

After the recesses 36 have been formed in the photoresist, the substrate with the photoresist remaining is baked under a vacuum ranging from approximately $10^{-1}$ to $10^{-2}$ torr at a temperature of approximately 200° C. for a minimum of approximately 8 hours. Baking hardens the photoresist layer and, in addition, causes some of the various solvents that are entrapped in the photoresist to be outgassed.

It should be appreciated that the KTFR which has been utilized as a photoresist is a positive resist which, when exposed to heat or more light, becomes harder and harder. It is possible to utilize a negative photoresist such as KEMR. However, the use of such photoresist is not as desirable because such a resist when it is exposed to light or to a high temperature becomes softer rather than harder.

After the stripe-like recesses 36 have been formed, the substrate 21 can be cleaned with a detergent and then rinsed in deionized water and dried by blowing air on the same. The resist is in the form of parallel raised stripes 31a extending across the substrate 21. It is desirable that the stripes 31a be from two to three times thicker than the multilayer coating which is to be deposited in the recesses. To avoid excessive shadowing during application of the multilayer coating, a width to height ratio of at least five is desirable for the lines or stripes 31a.

After the photoresist stripes 31a have been formed as shown in FIG. 5, the substrate 21 is placed in a vacuum coating chamber and a suitable multilayer dielectric coating 38 such as a coating capable of reflecting at least one color such as red is deposited on the substrate 21 on the side facing the photoresist 31. The coating is deposited on the stripes 31a and in the recesses 36 and has a thickness which is substantially less than the depth of the recesses 36 so that the upper portions of the side walls of the photoresist stripes 31a will be exposed as shown in FIG. 6. By way of example, the coating 38 can have a thickness of approximately 2 microns, whereas the photoresist 31 can have a thickness from 4 to 6 microns. It is desirable that the photoresist in general have a thickness which is substantially greater than the thickness of the coating which is to be applied because the thickness of the photoresist may vary over the surface of the substrate 21 and it is necessary that the photoresist stripes 31a have a height which is substantially above the coating 38 within the recesses 36 so that the side walls of the photoresist stripes will be exposed.

The red reflecting coating 38 is designed so that it will match with the index of refraction of the glass substrate 21 which can have an index of refraction of 1.52 and on the other side can match into an index of approximately 2.0 which is the index of refraction of the photocathode of a vidicon tube with which the dichroic filter is to be utilized. A suitable design for a red reflecting coating is set forth below.

$$1.52 \quad \begin{array}{c} n \simeq 1.0 \\ H \quad L \quad \left(\dfrac{L}{2} H \dfrac{L}{2}\right)^7 \quad L \\ 792 \quad 420 \quad\quad 715 \quad\quad 500 \end{array}$$

Figure 16:
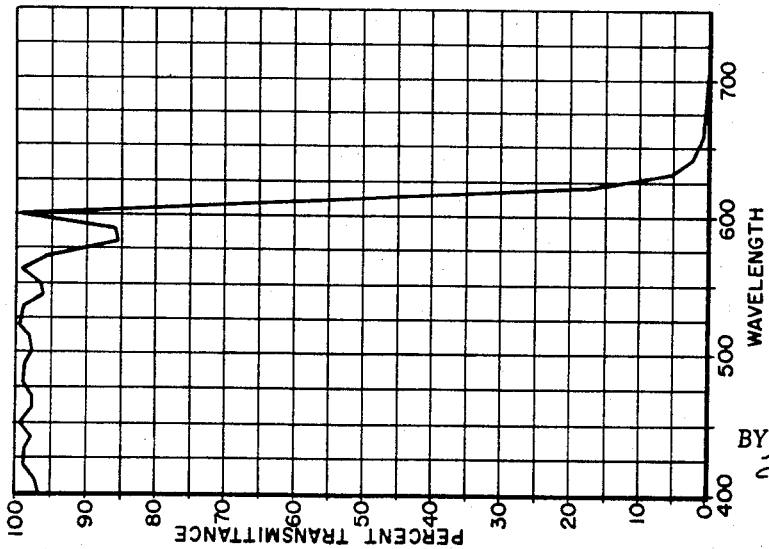

As can be seen from the above, the red reflecting or Cyan transmitting coating consists of a red reflecting stack which is centered at 715 nanometers and reflects from approximately 590 – 750 nanometers (see FIG. 16). Anti-reflection layers are provided on each side of the stack. The low index material can be a suitable quartz-like material such as quartz ($SiO_2$) having an index of refraction of 1.46 which is formed by silicon monoxide (SiO) which is gas reacted with oxygen to produce silicon dioxide ($SiO_2$). The high index material is titanium dioxide which has an index of refraction of 2.3. The anti-reflection layers consist of two layers. The one adjacent the surface 22 has a quarter wave optical thickness at 792 nanometers and the other low index layer has a quarter wave optical thickness at 420 nanometers. Both layers serve to match the 1.52 index of the glass substrate 21. The other anti-reflection coating is formed of a low index material and has a quarter wave optical thickness at 500 nanometers and matches the red reflecting coating into the 2.0 index of the photocathode. Thus, the multi-layer coating is comprised of 16 layers and is reflecting from 590 to 750 nanometers.

After the coating operation has been completed, the substrate 21 is immersed in a suitable solvent as, for example, Xylene which is preferably at an elevated temperature as, for example, 100° C. After soaking in the hot Xylene for a suitable period of time, preferably in excess of one hour, it has been found that the hot Xylene first attacks the exposed side walls of the resist stripes 31a and thereafter loosens, swells and dissolves the resist. After a suitable period of time, the substrates or parts 21 can be removed from the hot Xylene and the parts rubbed lightly with a cotton ball to readily remove any excess resist which remains on the substrate so that all that remains are a first set of spaced parallel lines 38a formed from the coating 38. Thus, it can be seen that the photoresist stripes are lifted from the substrate 21 by the hot Xylene to produce the lines 38a.

By way of example, the lines formed by the coating 38 can have a thickness of approximately 1.7 microns and a width of approximately 25 microns.

The substrate is then baked at 550° F. for approximately 2 hours, after which it is cleaned with a detergent and thereafter rinsed with deionized water and dried by blowing air on the same.

After the substrate has been cleaned, another layer 41 of a material such as KTFR, a positive photoresist, is spun onto the surface 22 and over the stripes 38 as shown in FIG. 8 so that the photoresist has a depth ranging from 4 to 6 microns. The photoresist layer 41 is then baked at an atmospheric temperature of approximately 75° C. for a period of approximately 10 minutes and a red antihalation coating 42 is applied to the surface 23 of the substrate 21 or, in other words, is applied to the fiducial mark side of the substrate 21.

The master mask 33 is positioned so that it overlies the substrate 21 and so that the stripes on the master mask are positioned at a predetermined angle with respect to the stripes 38 as, for example, an angle of approximately 41°. The photoresist layer 41 is then exposed to a collimated light source utilizing a Xenon arc lamp to expose the photoresist in the manner similar to the manner in which the photoresist layer 31 was exposed. The antihalation coating 42 is then removed by the use of Scotch tape. The photoresist layer 41 is then spray developed utilizing KTFR developer and then rinsing with a KTFR rinse. The substrate 21 is then dried by blowing air on the same. The undeveloped photoresist which has been removed leaves parallel recesses 43 and a plurality of spaced stripes 41a of photoresist which overlie and cross the red reflecting stripes 38a and overlie the surface 22.

The substrate 21 is then taken and placed in a vacuum oven and baked at a temperature of approximately 200° C. for a minimum of 8 hours in a vacuum of $10^{-1}$ to $10^{-2}$ Torr. As in the previous step, this baking causes outgassing of any entrapped solvents in the photoresist and, in addition, hardens the photoresist. The substrate 21 is then cleaned with a detergent, rinsed in deionized water and dried by blowing air on the same. A multi-layer dielectric reflecting coating 46 capable of reflecting at least one color different from the one color reflected by the first set of stripes is then deposited over the photoresist stripes 41a, the red reflecting stripes 38a and and on the surface 22 as shown in FIG. 10. The reflecting coating 46 which can reflect a color such as blue is deposited to a suitable depth as, for example, approximately 2 microns. It is necessary that the photoresist stripes 41a have a height which is significantly greater than the coating 46 so that the side walls of the photoresist are exposed as shown in FIG. 10 for reasons pointed out with respect to stripes 31a.

A design for a suitable blue reflector is set forth below.

$$1.52 \quad \begin{array}{c} n \simeq .9 \rightarrow 1.5 \\ L \quad \left(\dfrac{H}{2} L \dfrac{H}{2}\right)^7 \quad H \quad L \\ 600 \quad 394 \quad\quad \underline{82 \;\; 318} \\ 279 \end{array}$$

Figure 17:
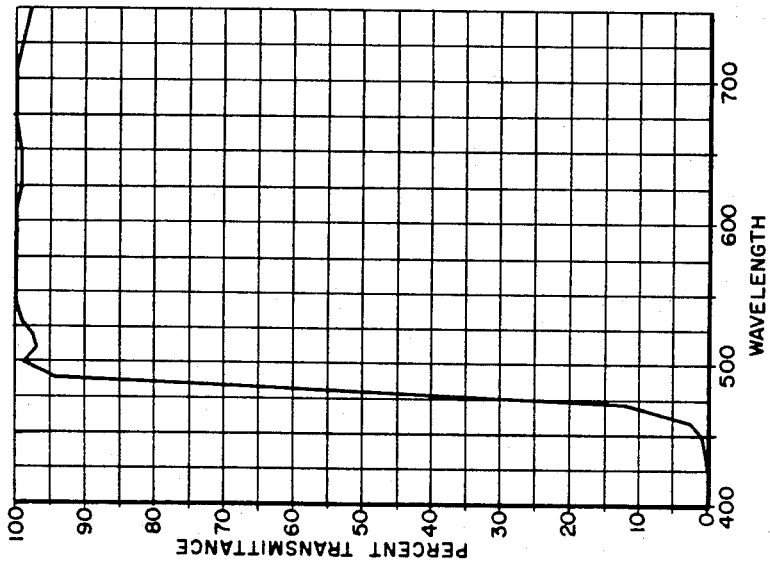

It can be seen that the design for the blue reflecting or yellow transmitting coating includes a blue reflecting stack centered at 394 nanometers which reflects from approximately 350 to 485 nanometers (see FIG. 17). Anti-reflecting layers are provided on both sides of the blue reflecting stack. Thus, there is provided a layer of low index material having a quarter wave optical thickness at 600 nanometers for matching to the red reflecting coating. On the other side of the blue reflecting stack, there is provided a layer of high index material having a quarter wave optical thickness at 82 nanometers and a layer of low index material having a quarter wave optical thickness at 318 nanometers for a total of 17 layers for the blue reflecting coating The last layer of the blue reflecting stack combines with the layer having a quarter wave optical thickness of 72 nanometers to provide a combined layer having a quarter wave optical thickness at 279 nanometers. The low and high index materials utilized for the layers can be of the type hereinbefore described in conjunction with the red reflecting coating.

After the blue reflecting coating has been deposited upon the substrate, the substrate is immersed in hot 100° C. Xylene for a suitable period as, for example, preferably in excess of one hour. As explained previously, the hot Xylene attacks the exposed side walls of the photoresist stripes 41a so that the portions of the coating 46 overlying the photoresist stripes can be lifted off so that there remains two sets of stripes, one, the red reflecting stripes 38a and the other blue reflecting stripes 46a which cross over each other at an angle of approximately 41°. One set of stripes 38a reflects the red energy and transmits blue and green energy. The second set of stripes 46a reflects blue energy and transmits green and red energy. In the areas where the stripes cross each other, the coating serves to transmit the green and reflect the red and the blue. In other areas where there is no coating on the surface 22, substantially 100% of the light is transmitted. These respective areas have been indicated in FIG. 11 in which the areas are identified with letters as set forth below:

C = clear area
−R = red reflector (or Cyan by transmittance)
−B = blue reflector (or yellow by transmittance)
G = green transmitter (overlap of −R and −B)

The design for the composite (intersections) of the red and blue reflecting coatings 38a and 46a is shown below:

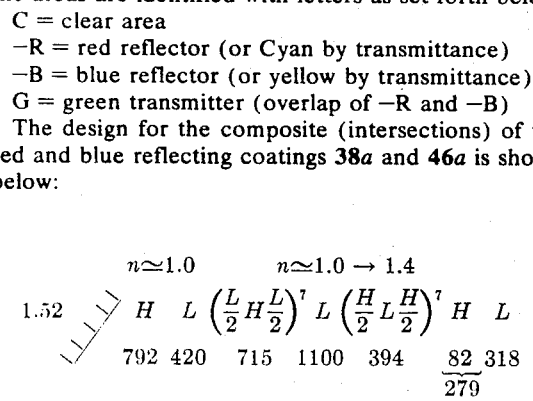

Figure 18:
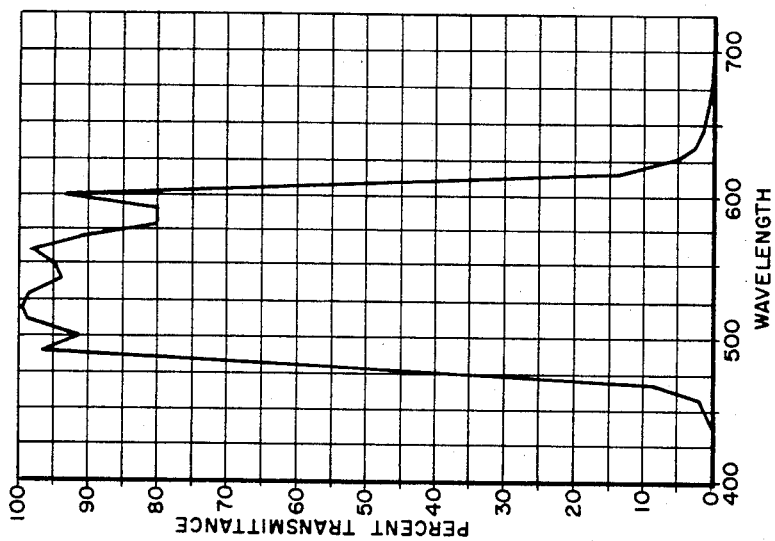
FIGS. 16–18 are graphs showing the spectral performance which can be obtained from a striped dichroic filter.

The red and blue reflector stacks can be readily identified. The last reflecting layer of the red stack and the first anti-reflecting layer of the blue stack are combined to provide the layer formed of low index material having a quarter wave optical thickness of 1,100 nanometers. A curve showing the results of Cyan plus yellow which provide magenta is shown in FIG. 18.

After the substrate has been soaked in Xylene for a suitable period of time, the photoresist is lifted off by gently scrubbing the resist from between the stripes 46a. The substrate is then cleaned, rinsed with ionized water and blown dry with air. The substrate is then baked at a suitable temperature, such as 550° F., for a period of approximately 2 hours.

For the 715 nanometer red reflecting stack, the Herpin index in the region of interest is 1.0. For the 394 nanometer blue reflecting stack, the Herpin index varies from about 0.9 to 1.5. The Herpin indices are numbers which are generated for the dielectric stack based upon the indices of refraction of the materials utilized in the stack.

Figure 14:
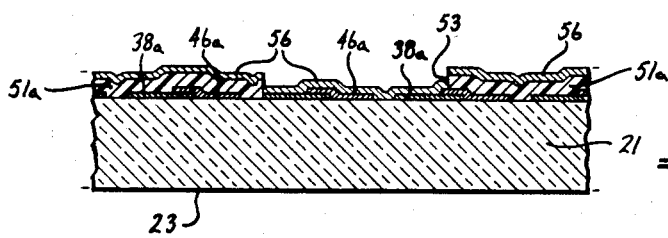

This completes the dichroic filter so that it can be utilized in conjunction with a vidicon tube as hereinafter described In certain applications, there is a need for an additional set of stripes on the dichroic filter which serve as a reflector for a different color such as green. For such stripes, it is necessary to provide a coating which has a reflection from approximately 505 to 585 nanometers to provide a relatively narrow reflection band in the green. This additional set of stripes is provided in a manner very similar to the manner in which the previous stripes were provided on the dichroic filter. Thus, after the steps have been completed to form the dichroic filter as shown in FIG. 11, the dichroic filter is cleaned and then a layer 51 of a KTFR positive photoresist is spun onto the substrate 21 and overlies the red reflecting stripes 38a and the blue reflecting stripes 46a to a suitable depth as, for example, 4 to 6 microns. The substrate is then subjected to a pre-exposure bake for a period of 10 minutes at 75° C. A red antihalation coating 52 is applied to the back side for the side 23 of the substrate 21 carrying the fiducial mark for a purpose hereinbefore described. The photoresist layer 51 is then exposed through the master 33 with the master having its stripes aligned at a predetermined angle with respect to the red reflecting and blue reflecting stripes as, for example, an angle of 45° with respect to the red reflecting stripe and an angle of 45° with respect to the blue reflecting stripes. The photoresist is again exposed through a collimated light source utilizing a Xenon arc. After exposure, the antihalation coating 52 is removed and the KTFR is developed by utilizing a spray developer. The substrate is then rinsed with the KTFR rinse to remove the undeveloped photoresist to provide recesses 53 formed between stripes 51a of the photoresist. The photoresist is then vacuum baked at approximately 200° C. for a minimum of 8 hours in the manner hereinafter described and thereafter is cleaned, rinsed in deionized water and blown dry with air. A multilayer dielectric coating 56 is then deposited upon the substrate on the photoresist stripes and on the red reflecting stripes 38a and the blue reflecting stripes 46a as shown particularly in FIG. 14. The green reflecting coating can have a design as follows:

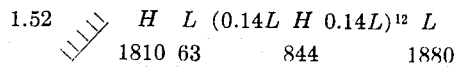

To obtain a narrow reflection band, a mismatched stack is utilized. As is well known to those skilled in the art, a normal stack is defined as one which consists of a one-to-one ratio of high index layers to low index layers. The present green reflecting stack is a mismatched stack which has a ratio of 3½ times more high index material than low index material which results in a narrow band pass. The green reflecting stack is centered at 844 nanometers and reflects from 505 to 585 nanometers. Anti-reflecting layers are provided on both sides of the green reflecting stack. Thus, there is provided a layer of high index material having a quarter wave optical thickness of 1,810 nanometers. There is also provided a layer of low index material which has a quarter wave optical thickness at 63 nanometers. This anti-reflection coating serves to match the green reflecting coating to the red reflecting stripes and also to the blue reflecting stripes. The outer anti-reflection layer has a quarter wave optical thickness at 1,880 nanometers, which is utilized for matching the green reflecting stripes to air.

Zirconium oxide ($ZrO_2$) with an index of refraction of approximately 2.0 was utilized as a high index material, whereas Vycor was utilized as the low index material. Zirconium oxide was utilized as a high index material rather than titanium dioxide because the high index layers are relatively thick. To make titanium dioxide layers of this thickness would require a substantial amount of time and also reduce the glow step which must be utilized with titanium oxide to reduce the absorption to an acceptable level. The use of zirconium oxide is also advantageous in that it provides a narrower rejection band as contrasted with silicon oxide and a quartz-like material such as Vycor or quartz.

Figure 15:
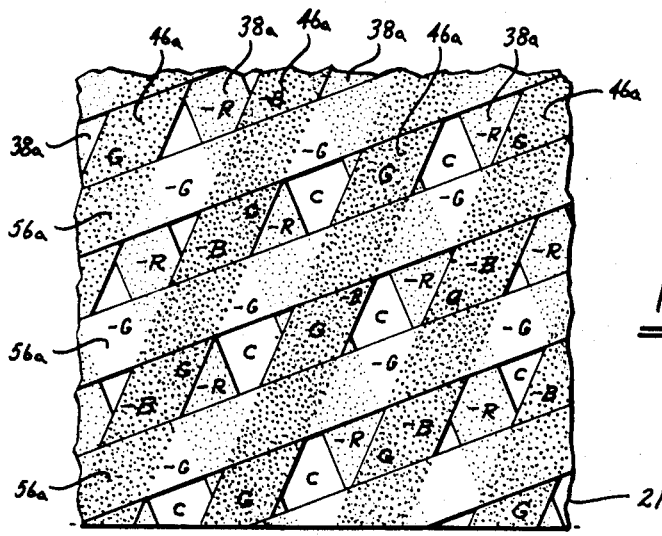

After the coating 56 has been deposited, the substrate 21 is baked at a temperature of 550° for approximately 2 hours, after which the substrate is immersed in hot 100° C. Xylene for a suitable period as, for example, one-half hour to one hour, after which it is gently rubbed to lift off the photoresist stripes and the portions of the coating carried thereby so that there only remains spaced parallel green reflecting stripes 56a which cross over the red reflecting stripes 38a and the blue reflecting stripes 46a as shown in FIG. 15. The various areas of the dichroic filter formed of the three types of stripes can be identified as follows:

C = clear
−R = red reflector (or Cyan)
−B = blue reflector (or yellow)
G = green transmitter (or overlap of −R and −B)
−G = green reflecting After the photoresist has been lifted off, the substrate can be cleaned, rinsed with deionized water and dried, after which it is baked at 550° F. for approximately 2 hours. The dichroic filter is then complete and is ready for use. By way of example, dichroic filters in accordance with the present invention were able to meet the following specifications. The red reflecting (Cyan) and blue reflecting (yellow) stripes were both placed on a single surface of the substrate. A stripe frequency of 500 line pairs per inch was readily achieved The red reflecting and blue reflecting stripes were oriented at 41° ± 1° with respect to each other.

The red reflecting (Cyan) filter had 50 percent absolute transmittance at 595 millimicrons ± 7 millimicrons. Transmittance was 80 percent average or greater from 400 to 535 millimicrons in media of N = 2.0. Transmittance was 5 percent or less from 600 to 700 nanometers when in media of N = 2.0. The blue reflecting (yellow) filter had a 50 percent absolute transmittance at 480 nanometers ± 7 nanometers. Transmittance was 80 percent average or greater from 512 to 700 nanometers when in a media of N = 2.0. Transmittance was 5 percent or less from 400 to 418 nanometers when in media of N = 2.0.

The line width variation from one dichroic filter to another in the mean width of the Cyan and yellow lines over a clear substrate was within 20 percent of nominal. On any particular dichroic filter, the respective mean dimensions of all solid areas of a given color were within 10 percent of the largest dimension recorded.

In general, it can be stated that there has been provided a method which utilizes a resist lift-off technique for producing striped dichroics of excellent quality which is very hard and durable. It will pass conventional rubber eraser tests and various humidity tests so that the filter can be readily cleaned. In addition, it can readily withstand the processing steps which are encounted in incorporating the same in a vidicon tube as hereinafter described. The filter has excellent spectral performance with high reflection in the required regions and high transmission outside of the rejection region.

In order to utilize the striped dichroic filter, it is necessary to position the striped dichroic filter in the image plane. One manner in which this can be accomplished is by placing the striped dichroic filter within a vidicon tube and integral with the face plate of the vidicon tube so that it is in the image plane for the vidicon tube. Alternatively, a fiber optic face plate can be provided for the vidicon tube to take the image plane from the inside of the vidicon tube and to bring it to an exterior surface to which the striped dichroic filter can be secured. In this way, it will be possible to cement the stripes directly to the face of the fiber optics face plate. Still another manner in which the striped dichroic filter could be utilized is by the use of a relay lens which again moves the image plane from the inside of the face of the vidcon tube. With utilization of such relay lenses, it would be possible to separate the stripes and place them on separate substrates if desired.

Although the preceding method which has been described for making striped dichroic filters incorporating the present invention has stressed a resist lift-off technique, it should be appreciated that a metal lift-off technique can be utilized if desired. In utilizing the metal lift-off technique or method, a metal layer would be deposited on the surface 22 in place of the resist layer 31 to a similar thickness as, for example, a thickness of 5 to 6 microns. Nickel or chromium have been found to be suitable for this purpose. Thereafter, a photoresist layer is applied to the metal layer and the photoresist layer is exposed in the conventional manner and the undeveloped photoresist removed to expose a striped pattern in the metal. The metal is thereafter etched away by a suitable etch to expose the surface 22. A coating which is to form the first set of stripes of the dichroic filter can then be deposited in the recesses in the metal and also on the metal. The coating is again applied to a thickness which is substantially less than the thickness of the metal stripes so that portions of the side walls of the metal stripes are exposed and can be subsequently etched away to lift off the undesired coating material and the metal so that there remains a set of multi-layer dielectric stripes of the type hereinbefore described. When the next set of stripes is ready to be formed, a metal layer can again be deposited on the stripes in the same manner as the layer of photoresist to a depth of 5 to 6 microns and the same steps repeated to form the next set of stripes. Thus, it can be seen that a striped dichroic filter can be made utilizing a metal lift-off technique as well as the resist lift-off technique hereinbefore described. The resist lift-off technique has been chosen as a preferable method because it requires fewer steps and also because the deposition of the nickel or chromium metal to a suitable thickness requires a substantial period of time as, for example, 2 hours in a coating chamber.

Although the striped dichroic filter described has been particularly adapted for the utilization with color television, it is readily apparent that in place of the colored stripes that have been provided, stripes having other color characteristics can be readily provided.

It is apparent from the foregoing that there has been provided a striped dichroic filter and method for making the same which has excellent characteristics and which is particularly adapted for use in conjunction with a single tube vidicon camera for obtaining the necessary color information from the scenes being viewed by the vidicon tube. The color information which is obtained is matrixed to provide the red, blue and green information from either the two types of dichroic filters which are disclosed.

We claim:

1. In a striped dichroic filter, a substantially transparent glass substrate having a surface, a first set of spaced parallel stripes for reflecting at least one color, and a second set of spaced parallel stripes for reflecting at least one color different from said one color reflected by said first set of stripes, said first and second sets of stripes being disposed on said surface at an angle with respect to each other with the first and second sets overlying each other on certain areas of said surface, each of said stripes being formed of a plurality of layers of high and low index dielectric materials.

2. A filter as in claim 1 wherein said stripes are are formed with an outermost layer of a dielectric to permit cleaning of said filter.

3. A filter as in claim 1 wherein said first set of stripes is formed to reflect red and wherein said second set of stripes is capable of reflecting blue.

4. A filter as in claim 3 wherein said stripes of said first set of stripes includes a red reflecting stack which reflects from approximately 590 to 750 nanometers together with anti-reflection layers disposed on opposite sides of the red reflecting stack.

5. A filter as in claim 3 wherein each of said stripes of said second set of stripes includes a blue reflecting stack reflecting from approximately 380 to 485 nanometers and an anti-reflection coating disposed on each side of the blue reflecting stack.

6. A filter as in claim 1 together with a third set of spaced parallel stripes carried on said surface at an angle with respect to said first and second sets for transmitting at least one color different from said one colors reflected by said first and second sets.

7. A filter as in claim 6 wherein each of said stripes of said third set of stripes includes a green transmitting stack transmitting from approximately 505 to 585 nanometers and anti-reflection layers disposed on each side of the green transmitting stack.

8. A filter as in claim 4 wherein said high index material is titanium dioxide and said low index material is a quartz-like material.

9. A filter as in claim 6 wherein said high index material is zirconium oxide and said low index material is a quartz-like material.

10. A filter as in claim 1 wherein said stripes of each set have a thickness in excess of one micron.

* * * * *